| United States Patent [19] | [11] | Patent Number: | 4,599,087 |
|---|---|---|---|
| Heller et al. | [45] | Date of Patent: | Jul. 8, 1986 |

[54] TREATMENT OF TEXTILE MATERIALS TO IMPROVE THE FASTNESS OF DYEINGS MADE THEREON

[75] Inventors: Jürg Heller, Oberwil; Bruno Kissling, Hagendorf; Tibor Robinson, Basel; Salvatore Valenti, Binningen, all of Switzerland

[73] Assignee: Sandoz Ltd., Basel, Switzerland

[21] Appl. No.: 686,136

[22] Filed: Dec. 24, 1984

[30] Foreign Application Priority Data

| Jan. 3, 1984 | [DE] | Fed. Rep. of Germany | 3400054 |
| Mar. 9, 1984 | [DE] | Fed. Rep. of Germany | 3408638 |
| Jul. 21, 1984 | [DE] | Fed. Rep. of Germany | 3426925 |
| Jul. 21, 1984 | [DE] | Fed. Rep. of Germany | 3426926 |

[51] Int. Cl.$^4$ ............... C08G 73/02; D06L 3/12; D06P 1/52
[52] U.S. Cl. ............... 8/495; 8/539; 8/549; 8/685; 8/918; 8/922; 8/924; 8/927; 8/532; 8/917; 528/405; 564/511; 564/512
[58] Field of Search ............ 8/495, 551, 554, 556

[56] References Cited

U.S. PATENT DOCUMENTS

| 4,331,441 | 5/1982 | Dvorsky et al. | 8/542 |
| 4,410,652 | 10/1983 | Robinson et al. | 8/496 |
| 4,436,524 | 3/1984 | Valenti | 8/551 |
| 4,439,203 | 3/1984 | Runyon et al. | 8/496 |
| 4,439,208 | 3/1984 | Moser et al. | 8/556 |
| 4,443,223 | 4/1984 | Kissling et al. | 8/496 |
| 4,452,606 | 6/1984 | van Diest et al. | 8/496 |
| 4,475,920 | 10/1984 | Baumann | 8/542 |
| 4,484,927 | 11/1984 | Valenti | 8/554 |

FOREIGN PATENT DOCUMENTS

574536 4/1976 Switzerland .
755520 8/1956 United Kingdom .

*Primary Examiner*—A. Lionel Clingman
*Attorney, Agent, or Firm*—Gerald D. Sharkin; Richard E. Vila; Thomas C. Doyle

[57] ABSTRACT

Polymeric compounds (A) obtained by the reaction of epihalohydrin with a polyalkylene polyamine are useful as textile treatment agents. As pretreatment agents they improve the color yield of the subsequent dyeing, as aftertreatment agents they improve fastness properties. Certain of the products (A) are novel.

22 Claims, No Drawings

TREATMENT OF TEXTILE MATERIALS TO IMPROVE THE FASTNESS OF DYEINGS MADE THEREON

This invention relates to the dyeing, printing and optical brightening of textile fibres.

The present invention provides a process for the dyeing, printing or optical brightening of nitrogen- or hydroxy group-containing textile fibres, characterized in that the textile substrate is treated with an anionic or basic dyestuff or brightener and previously, simultaneously or subsequently, with a polymeric compound (A) obtained by the reaction of an epihalohydrin or a precursor thereof with a polyalkylenepolyamine (B).

The textile fibres are preferably hydroxy group-containing fibres, particularly natural or regenerated cellulosic fibres, especially cotton. Useful results are also obtainable on nitrogen-containing fibres such as polyacrylonitrile and natural or synthetic polyamides, preferably wool, silk or nylon. Acid modified polyester and polyamide, which contain acidic hydroxy groups, may also be used.

The fibres may be in the form of loose fibres or yarns or fabrics, or in any suitable form. Fabrics are a convenient and preferred form. The fibres may be blended with other fibres which are susceptible treatment by the process of the invention or with fibres which are not so susceptible. For example, cotton and regenerated cellulose fibres may be blended together or individually with polyester fibres, the latter being dyed with disperse dyes. Fibre blends and yarn blends may be used.

The process may also be used in the dyeing of leather.

The pretreated fibres may be dyed or printed with anionic dyestuffs, including direct dyes, acid dyes and reactive dyes, or with basic dyestuffs. Preferred dyes are direct dyes, preferably those having at least two sulphonic acid or sulphonamide groups in the dye molecule, more preferably 3–8 such groups, particularly 4–6. Particularly preferred are highly substantive direct dyes which show a high degree of exhaust on cotton when dyed by the conventional exhaust process, for example those having a degree of exhaustion on cotton of 70–100%, preferably 80–100% when dyed at the boil at 1/1 standard depth. Preferably the direct dyes have a molecular weight above 1000, more preferably above 1200. Preferably the direct dyes are in the form of 1:1 or 1:2 metal complexes, particularly copper complexes.

Particularly suitable direct dyes are those meeting the criteria set out in U.S. Pat. No. 4,410,652, the dyes whose formulae are listed in that U.S. patent, and those listed in U.S. Pat. No. 4,439,203 under their Colour Index numbers.

A further group of particularly suitable dyes have the properties both of direct dyes and of reactive dyes. They are highly substantive as described above, and also contain in their molecule one or more halogens attached to aromatic heterocyclic rings, which can be split off as an anion under alkali fixation conditions. Preferred dyestuffs of this type contain one or two mono- or di-halo (particularly chloro-) substituted triazinyl groups.

Examples of dyestuffs with one such group correspond to formula I

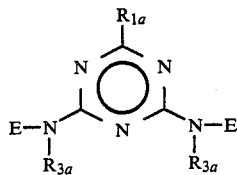

in which
each $R_{3a}$ independently is hydrogen; $(C_{1-4})$alkyl; or $(C_{1-4})$alkyl substituted by one —OH, —CN or phenyl group;
$R_{1a}$ is Cl or F, particularly Cl
and E are identical or different chromophoric groups.

Examples of dyestuffs with two triazinyl groups are those of formula VI

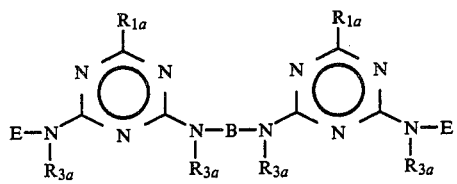

in which $R_{1a}$, $R_{3a}$ and E are as defined above, and B is a direct bond or a divalent aliphatic, aromatic, cycloaliphatic or heterocyclic bridging group, or forms a heterocyclic bridging group together with the two

groups to which it is joined.

In the compounds of formulae V and VI, the chromophoric group E can be identical or different residues of mono- or polyazo dyes, or of anthraquinone, stilbene, hydrazone, methine or azomethine dyes, in which the mono- or polyazo dye residues may be in the form of 1:1 or 1:2 metal complexes, such as 1:1 copper, chromium, cobalt, nickel or manganese or 1:2 chromium, cobalt or iron complexes.

The bridging group B is preferably of formula

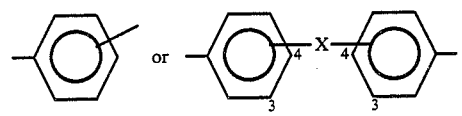

in which X can be bound in the 4,4-, 3,4- or 3,3-positions and represents a direct bond or a bridging group such as is conventional in the chemistry of direct dyestuffs, or B may form a piperazine ring together with the two

groups to which it is bound.

Suitable triazinyl group-containing dyestuffs are disclosed in British published Patent Applications 2,106,126 A, 2,111,538 A and 2,122,634 A.

Suitable dyestuffs for use in dyeing polyamide pretreated according to the invention are known under the description of C.I. Acid Dyes.

The pretreated textile fibre may be dyed or printed with reactive dyes, particularly those containing a 5- or 6-membered heterocyclic ring having aromatic character and containing 2 or 3 nitrogen atoms, which is substituted by 1–3 halogen atoms which can be split off as anions during fixation. The reactive group can also be a vinylsulphonyl-, vinylcarbonyl-, sulphato- or sulphate ester group. Such dyes are known under the designation C.I. Reactive Dyes.

Suitable reactive dyes are for example C.I. Reactive Red 118, C.I. Reactive Blue 23, C.I. Reactive Blue 79 and C.I. Reactive Violet 23.

Basic dyestuffs suitable for use in conjunction with the pretreatment step according to the invention are generally those designated as C.I. Basic Dyes. They contain protonatable primary, secondary or tertiary amino groups and/or quaternary ammonium groups, and may also contain sulphonic acid groups, provided that the number of basic groups is higher than the number of acid groups in the molecule. Basic dyes may also be in the form of 1:1 or 1:2 metaL complexes. Suitable basic dyes are described for example in U.S. Pat. No. 4,439,208.

In addition to the above-mentioned anionic and basic dyes, it is also possible to dye or print the treated textile fibres with phthalocyanine, vat, formazan, di- or tri-phenylmethane or indigo dyestuffs.

Optical brighteners may also be used, preferably anionic optical brighteners which are substantive to cotton. Where the substrate has been pretreated according to the invention it may also be possible to use cationic brighteners.

Dyeing, printing or brightening may be carried out by conventional methods suited to the substrate and the dye or brightener to be used. The substrate may be already pretreated with the polymeric compound (A), and may or may not have been subjected to an intermediate drying step.

A particularly preferred process consists in pretreatment followed by dyeing with a reactive dye under acid conditions, e.g. pH 3–7, particularly pH 4–6. This allows for example mixed cotton/polyester fabrics to be dyed in a one-bath process using a mixture of disperse and reactive dyes under acid conditions, with considerable savings in dyeing time.

The polymeric compound (A) is the reaction product of polyalkylene polyamine (B) with an epihalohydrin or a precursor thereof. An example of an epihalohydrin precursor is a dihalohydrin of formula Hal—CH$_2$—CHOH—CH$_2$—Hal where Hal is fluorine, chlorine or bromine preferably chlorine or bromine, particularly chlorine. Preferred reagents are dichlorohydrin and epichlorohydrin, particularly the latter.

Preferably from 0.15 to 2.5 mole, more preferably 0.2 to 1.35 mole of epihalohydrin is reacted for each basic nitrogen atom (i.e. primary, secondary or tertiary amino group) in the molecule of the polyalkylene polyamine.

Preferred polyalkylene polyamines (B) are of formula I

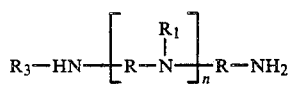

in which
n is an integer from 1 to 5;
each R independently, is $C_{2-6}$alkylene, preferably $C_{2-4}$alkylene,
each $R_1$ independently is hydrogen, phenyl, $C_{1-4}$alkyl or $C_{1-4}$alkyl substituted by OH, $C_{1-4}$alkoxy, halogen or phenyl;
and $R_3$ is hydrogen, $C_{1-22}$alkyl, $C_{2-22}$alkenyl or $C_{2-22}$alkynyl;
or of formula I'

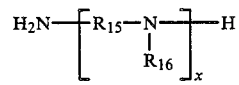

in which
each $R_{15}$ independently is $C_{2-4}$alkylene;
each $R_{16}$ independently is hydrogen or a group

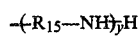

x and y being integers such that the molecular weight of the compound of formula I' lies between 300 and 70,000.

The compounds I and I' may be in free base or wholly or partly in acid addition salt form. Preferred salt forms are salts of mineral acids, particularly sulphuric acid. Compounds of formulae I and I' are known, or may be prepared from available starting materials by known methods. Certain compounds of formula I' are commercially available and may be described as polyalkylene polyimines.

Preferred polyalkylene polyamines include:
(a) H$_2$NCH$_2$CH$_2$CH$_2$NR$_8$CH$_2$CH$_2$CH$_2$NH$_2$ where R$_8$ is H or CH$_3$
(b) H$_2$N—(CH$_2$CH$_2$NH)$_{\overline{m}}$CH$_2$CH$_2$NH$_2$ where m=0 to 4
(c) H$_2$NCH$_2$CH$_2$CH$_2$NHCH$_2$CH$_2$NH$_2$
(d) H$_2$NCH$_2$CH$_2$CH$_2$NHCH$_2$CH$_2$NHCH$_2$CH$_2$CH$_2$NH$_2$
(e) R$_6$-(NHCH$_2$CH$_2$CH$_2$)$_{\overline{m}}$NH$_2$ where R$_6$ is C$_{8-22}$alkyl or C$_{8-22}$alkenyl, preferably C$_{12-18}$alkyl or C$_{12-18}$alkenyl and m=0 to 4
(f) H$_2$N-(CH$_2$CH$_2$NR$_7$)$_{\overline{x}}$H where R$_7$ is -(CH$_2$CH$_2$NH)$_{\overline{y}}$H and x and y are as defined above, the compound having a molecular weight of from 500 to 50,000.

For the above polyalkylenepolyamines (a) to (e) if q is the number of hydrogen atoms attached to nitrogen, and r is the total number of primary, secondary and tertiary amine groups in the molecule, then the number of moles of epihalohydrin which may react with 1 mole of amine is from 1 to (q+r) moles, preferably from 1 to q moles, more preferably from 1 to r moles. For the polyimines (f) however, which are already polymeric, reaction may be with from 0.05–0.2 moles epihalohydrin per repeating unit, preferably 0.1 moles.

The reaction may be carried out by adding the epihalohydrin or precursor to a solution of the amine or amine salt in water or an organic solvent at a temperature of from −5° to 100° C., preferably 20°–70° C., more preferably 20°–40° C. The reaction is exothermic and external cooling may be required. The product may be isolated by known methods or used in the form of its aqueous solution.

The product may be formed as an acid addition salt of a mineral acid, especially hydrochloric, sulphuric or phosphoric acid, or of an organic acid, e.g. formic, acetic, lactic, citric, glycollic or methanesulphonic acid.

For use as pretreatment agents, a further class of useful products (A1) are the reaction products of polymeric compounds (A) with an N-methylol compound in the presence of a catalyst. Such products are described as aftertreatment agents in U.S. Pat. No. 4,452,606, the disclosure of which is incorporated herein by reference.

A preferred group of polymeric compounds (A) are linear polymers (A1) formed by the reaction of from 1.5 to 2.5, preferably 1.8 to 2.3, more preferably approximately 2 moles of epihalohydrin or a precursor with one mole of a polyalkylene polyamine of formula Ia

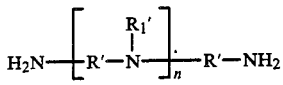  Ia where
each R' independently is $C_{2-4}$alkylene
each $R_1'$ independently is phenyl, $C_{1-4}$alkyl or $C_{1-4}$alkyl substituted by —OH, —$C_{1-4}$alkoxy, halogen or phenyl,
and n is as defined above.

Such compounds (A1) are polymers having the structure III

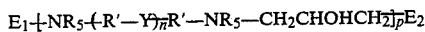  III in which
p is a number from 3 to 30,
$R_5$ is hydrogen or —$CH_2CHOHCH_2Hal$
R' is defined above
and Y is a group —$NR_1'$— or

where Hal is Cl, Br or F, particularly Cl and $A^\ominus$ is an anion, and of the two $R_5$ groups in the repeating unit, on average 0.5-1.5 are —$CH_2CHOHCH_2Hal$ groups.

The groups $E_1$ and $E_2$ represent end groups, of which $E_1$ may be H or $HalCH_2CHOHCH_2$— and $E_2$ may be Hal or —$NR_5(R'—Y)_{\overline{n}}R'$—$NR_5H$.

A preferred group of linear polymers (A1) are formed by reacting epichlorohydrin in the stated mole ratios with an amine of formula Ia in which R' is R" is —$C_2H_4$— or $C_3H_6$— $R_1'$ is $R_1''$ where $R_1''$ is $CH_3$— or $C_2H_5$— and n is n' where n' is 1 to 3. Such polymers have the structure IV

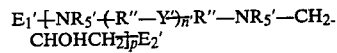  IV where
$R_5'$ is H or —$CH_2CHOHCH_2Cl$,
Y' is —$NR_1''$— or

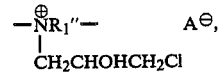

R", $R_1''$ and p are as defined above,
$E_1'$ is H or $ClCH_2CHOHCH_2$—,
$E_2'$ is Cl or —$NR_5'$+$R''$—$Y'$)$_{\overline{n'}}R''$—$NR_5'H$, and of the two groups $R_5'$ in the repeating unit, on average 0.5 to 1.5 are —$CH_2CHOHCH_2Cl$.

Particularly preferred linear polymers (A1) are formed by reacting 1.8-2.3 mole epichlorohydrin with 1 mole N,N-bis-(3-aminopropyl)methylamine.

Such polymers have the structure IVa

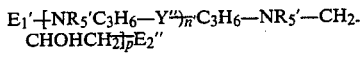  IVa in which
$R_5'$ and p are as defined above,
Y" is —$NCH_3$— or

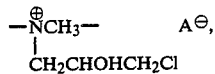

$E_1'$ is as defined above,
$E_2''$ is Cl or —$NR_5'$+$C_3H_6$—$Y''$)$_{\overline{n'}}C_3H_6NR_5'H$,
and of the two groups $R_5'$ in the repeating unit, on average 0.8 to 1.3 are —$CH_2CHOHCH_2Cl$.

In order to obtain predominantly linear polymers of the above structure, it is essential that during the reaction of epihalohydrin with amine Ia the temperature of the reaction mixture must not be allowed to rise above 40° C., nor to remain at 40° C. for longer than 1 hour after all the epihalohydrin has been added although if the reaction is carried out at lower temperatures, longer reaction times may be used. Higher temperatures and/or longer reaction times at 40° C. give rise to crosslinked structures, which are no longer water-soluble.

The pretreatment of textile fibres with the polymeric compound (A) or (A1) can be carried out by a continuous process such as padding, dipping, spraying or foam application, but is preferably carried out in a batchwise exhaust process. Both types of process may be carried out using an application bath at pH 4-14, preferably 7-14, more preferably 10-14. For exhaust application temperatures of 20°-90° C., preferably 50°-60° C. may be used, and the amount of compound (A) or (A1) in the bath is suitably 0.5-8% preferably 1-4% wt. of active substance based on the dry weight of substrate. For application by padding, a bath concentration of 5-60 g/l active substance, preferably 5-30 g/l may be used at a pickup of 60-80%.

The pretreated and dyed substrate may then be aftertreated with a fixing agent. The fixing agent may also be a product (A) or (A1), or may be for example (C) the product of reacting a mono- or polyfunctional primary or secondary amine with cyanamide, dicyandiamide, guanidine or bisguanidine (described as products (A) in U.S. Pat. No. 4,410,652, the disclosure of which is incorporated herein by reference) or (D) the product of reacting this product further with an N-methylol compound in the presence of a catalyst, as described in the same U.S. patent, or a mixture of (C) and (D). Further fixing agents are described in U.S. Pat. Nos. 4,423,223, 4,439,203 and 4,436,524.

Aftertreatment of a dyed, printed or brightened substrate with compounds (A) may be carried out on a substrate which is still moist or one which has been subjected to an intermediate drying step. Aftertreatment can be carried out by standard methods including padding and other continuous processes, but is preferably by a batchwise exhaust process. The aftertreatment may be carried out under acid, neutral or alkaline conditions, for example pH 4-5 or 10-11 at 15°-100° preferably 30°-70° for 3-60 minutes. The pH may be adjusted by addition of acetic acid or sodium carbonate.

The quantity of product (A) used for aftertreatment will depend upon the depth of the dyeing, but suitably from 0.25-25%, preferably 0.5-20% wt active product based on the dry weight of substrate may be used. If the application is by a long bath exhaust process (liquor to goods ratio >10:1), a concentration of 0.1 to 10 g/l, preferably 2-5 g/l may be used. For short bath exhaust processes or for padding, 10-100 g/l may be used.

A further process according to the invention consists in the aftertreatment of a dyed, printed or brightened substrate, simultaneously or sequentially with a compound (A) and with a product (C) or a product (D) described above.

For dyeing of cellulose, polyamide, acid-modified polyamide or acid-modified polyester with basic dyestuffs, it is also possible to apply compounds (A) and (A1) simultaneously with the dyestuff, from the same dyebath.

The use of compounds (A) or (A1) as pretreatment agents gives improved colour yields and allows shorter dyeing times. Fastness properties are thereby improved or at least are not negatively affected. It also has the advantage that inhomogeneous substrates such as cotton containing a high proportion of so-called 'dead' cotton (immature fibres which clump together and are less readily dyed) or 'miniblends' containing cotton with small amounts of synthetic fibres, can be dyed with good levelness and without white specks.

The use of compounds (A) as aftertreatment agents improves the wet fastness properties of the dyeing, particularly wash fastness.

The following examples illustrate the invention. Parts and percentages are by weight, and for dyebath components, percentages are based on dry weight of substrate. Temperatures are in °C.

Intrinsic viscosities are measured in water at 26° C.

EXAMPLES 1 TO 4

Preparation of compounds (A1)

Example 1

145 Parts N,N-bis-(3-aminopropyl)methylamine are dissolved in 600 parts water and the solution is stirred and cooled while 200 parts epichlorohydrin are added over 30 minutes, the temperature being kept below 40°. Stirring is continued at 40° until the viscosity of the solution increases markedly (after 40-60 min). The mixture is then cooled to room temperature and adjusted to pH 4 by gradual addition, with cooling, of approximately 160 parts 30% hydrochloric acid, the pH being measured on samples diluted to 1% concentration. A clear light yellow viscous solution is obtained (intrinsic viscosity = 0.758 cm$^3$/g, measured on 35% solids solution). The solution may be used as a pre- or aftertreatment agent without further processing.

Example 2

145 Parts N,N-bis-(3-aminopropyl)methylamine are dissolved in 370 parts water, and treated with 140 parts epichlorohydrin over 1 hour at 30° with stirring and cooling. Finally stirring is continued at 30° until the viscosity markedly increases (approx. 2 hours). The mixture is cooled to room temperature then approx. 250 parts of 30% hydrochloric acid added with external cooling until a sample diluted to 1% concentration has a pH of 4.0. A clear, light yellow, viscous solution is obtained, whose intrinsic viscosity is 0.1574 cm$^3$/g.

Example 3

Example 1 is repeated using 131 parts of the amine instead of 145 parts.

Example 4

Example 1 is repeated using 185 parts epichlorohydrin instead of 208 parts. The intrinsic viscosity of the product is 1.773 cm$^3$/g.

Example 5

Preparation of compound (A1)

56 Parts of the product of Example 1 are treated with 100 parts of a 50% aqueous solution of dimethyloldihydroxyethyleneurea and 15 parts magnesium chloride, and stirred for 1-2 hours at 70°. On cooling to room temperature a clear yellow solution is obtained.

EXAMPLES 6 TO 12

Preparation of compounds (A)

Example 6

51.5 Parts diethylene triamine (0.5 mole) are dissolved in 220 parts water and treated with 92.5 parts (1 mole) epichlorohydrin over 30 minutes at 40°. Finally the reaction mixture is stirred at the same temperature for a further 2 hours, then acidified to pH 2-3 with 74 parts 30% hydrochloric acid. A pale yellow, slightly viscous solution of intrinsic viscosity 0.04 cm$^3$/g is obtained which may be used without further processing as a pre- or after-treatment agent.

Examples 7 to 11

Table 1 shows the proportions of reagents used. The reaction conditions are as in Example 6.

TABLE I

| Ex. No. | amine | no. of moles epichlorohydrin per mole of amine | intrinsic viscosity of product (cm$^3$/g) |
|---|---|---|---|
| 7 | bis-(3-amino-propyl)amine | 4 | 1.02 |
| 8 | bis-(3-aminopropyl)-methylamine | 1 | 0.42 |
| 9(a) | N,N'—bis-(3-aminopropyl)ethylene diamine | 2 | — |
| 9(b) | triethylene tetramine | 2 | 0.06 |
| 10 | R—(NHCH$_2$CH$_2$CH$_2$)$_2$—NH$_2$ (R = C$_{12-18}$alkyl) | 1 | 0.05 |
| 11 | R—(NHCH$_2$CH$_2$CH$_2$)$_n$—NH$_2$ R as above n = 3-4 | 1 | — |

Example 12

43 Parts of polyethyleneimine of MW 30 000-40 000 are diluted with 150 parts of water then reacted with 9.3 parts epichlorohydrin at room temperature over 30 minutes. The resulting solution is acidified to pH 2-3 with approximately 40 parts 30% hydrochloric acid. A highly viscous solution of approx. 18% solids is obtained, with intrinsic viscosity 0.83 cm$^3$/g.

EXAMPLE 13 TO 16

Use as pretreatment agents

Example 13

(a) A 100% cotton fabric is pretreated in an exhaust bath containing 3% of the product of Example 1, calculated on active substance, at a liquor to goods ratio of 20:1. Pretreatment is carried out for 30 minutes at 60° and at a pH of 13, obtained by addition of 2 g/l caustic soda. The treated fabric is rinsed cold, neutralised with acetic acid, rinsed again and dried.

(b) The pretreated cotton of Example 13 (a) is dyed in conventional manner with 5.0% C.I. Reactive Blue 193 at pH 11, dyeing for 20 minutes at 70° in the presence of 25 g/l sodium chloride.

A blue dyeing is obtained which has good fastness properties and is deeper in tone than a comparable dyeing on non-pretreated cotton.

Good dyeings can also be obtained by the same method using C.I. Reactive Red 123, C.I. Reactive Blue 114, C.I. Reactive Blue 116, C.I. Reactive Yellow 111, C.I. Reactive Orange 69, C.I. Reactive Red 171 or C.I. Reactive Blue 104.

(c) The pretreated and dyed substrate may be aftertreated with the product of Example 1 of U.S. Pat. No. 4,410,652.

Example 14

(a) A 100% cotton fabric is pretreated in an exhaust bath containing 0.75% of the product of Example 8, calculated on active substance. Pretreatment is carried out at pH 10–12 for 20 minutes at 60°, and the treated substrate is rinsed, neutralised, rinsed and dried.

(b) The pretreated substrate is padded at 80–90% pickup with a liquor containing 27 g/l C.I. Reactive Red 171 and adjusted to pH 4.5 with acetic acid. The fabric is rolled up, wrapped in plastic film and allowed to dwell for 30 minutes. The dyed fabric is rinsed cold and then hot, then dried. In spite of the short dwell time a deep dyeing with good fastness properties is obtained.

Good dyeings can also be obtained using 6 g/l of C.I. Reactive Red 5 or Reactive Blue 163.

Example 16

(a) Cotton is pretreated as in Example 15(a).

(b) The pretreated substrate is dyed in an exhaust bath at a liquor to goods ratio 20:1 with 5% C.I. Reactive Blue 193 at a pH of 4.5 (adjusted with acetic acid) and in the presence of 25 g/l sodium chloride.

A deeper dyeing is obtained than for a comparable dyeing process on non-pretreated cotton.

Examples 13 to 16 may be repeated using the products of Examples 2–7 and 9–12.

EXAMPLES 17 TO 25

Use as aftertreatment agents

Example 17

A rinsed cotton substrate exhaust dyed with 3% C.I. Direct Blue 251 is aftertreated in an exhaust bath containing
1.5 g/l of the compound of Example 1,
10 g/l sodium chloride,
and 5 g/l sodium carbonate, and having a pH of 10.5. The liquor to goods ratio is 20:1, and aftertreatment is continued for 45 minutes at 50°.

The treated fabric is rinsed with cold water and dried. It shows improved wash fastness compared to a nontreated dyeing.

Example 18

Example 17 is repeated except that the 1.5 g/l of the product of Example 1 is replaced by
0.75 g/l compound of Example 1
plus 0.75 g/l product (A) as prepared by Example 1 of U.S. Pat. No. 4,410,652 (1st 2 paragraphs).

Similar good results are obtained.

Example 19

A rinsed cotton substrate exhaust dyed with 2% C.I. Direct Red 83 is treated under the same conditions as in Example 17 but with a bath containing
1.5 g/l compound of Example 1
10 g/l sodium chloride
acetic acid to pH 6.

The treated dyeing is cold rinsed and dried. It possesses good wash fastness properties.

Example 20

A rinsed cotton substrate exhaust dyed with 2% C.I. Direct Blue 83 is padded with a liquor containing 10 g/l of the product of Example 8, 10 g/l sodium chloride and 5 g/l sodium carbonate, to a pickup of approximately 80%. The rinsed and dried dyeing has good wet fastness properties.

Examples 21 to 24

Examples 17 to 20 are repeated using a dyeing with C.I. Reactive Blue 71 in place of the C.I. Direct dyes. Good wet fastness properties are obtained.

Example 25

A bleached 100% cotton fabric is dyed by standard methods with 2% of the dyestuff of Example 1 of British published application No. 2 111 538 A. The dyed fabric is treated, without intermediate drying, in an exhaust bath containing 2% of the compound of Example 8 and 5% sodium carbonate (pH 11.0), at a liquor to good ratio of 20:1. After 20 minutes at 60% the treated dyeing is rinsed with cold water.

The resulting dyeing has good wash fastness, and withstands washing at the boil.

Examples 17 to 25 may be repeated using the products of Examples 2 to 4, 6, 7 and 9 to 12.

What is claimed is:

1. A process for dyeing, printing or optically brightening a textile substrate comprising fibers containing nitrogen or hydroxy groups, which process comprises applying to said substrate a compound (A) or (A1) and applying subsequently thereto an anionic or basic dyestuff or optical brightener, said compound (A) being a polymeric compound obtained by the reaction of an epihalohydrin or precursur thereof with a polyalkylene polyamine (B) and said compound (A1) being a polymeric compound obtained by the reaction of a compound (A) with a N-methylol compound in the presence of a catalyst.

2. A process according to claim 1 in which the textile fibres are cotton, alone or blended with other fibres.

3. A process according to claim 1 in which the fibres are dyed with a direct dye containing one or two mono- or di-chlorotriazinyl groups per molecule.

4. A process according to claim 3 in which the direct dye is of formula V or VI

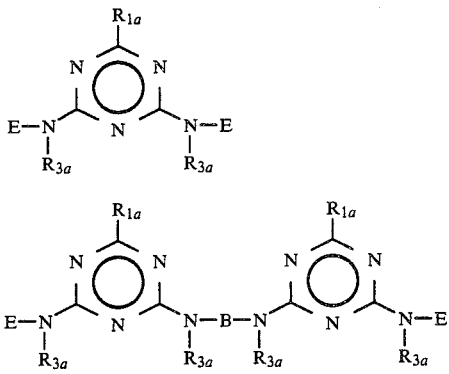

in which
each $R_{3a}$, independently, is hydrogen, $(C_{1-4})$alkyl; or $(C_{1-4})$alkyl substituted by one —OH, —CN or phenyl group;
$R_{1a}$ is Cl or F,
the E's are identical or different chromophoric groups
and B is a direct bond or a divalent aliphatic, aromatic, cycloaliphatic or heterocyclic bridging group, or forms a heterocyclic bridging group together with the two

groups in which it is joined.

5. A process according to claim 1 in which the polyalkylene polyamine (B) is of formula I

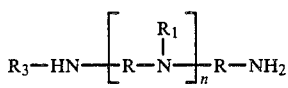

in which
n is an integer from 1 to 5;
each R, independently, is $C_{2-6}$alkylene,
each $R_1$ independently, is hydrogen, phenyl, $C_{1-4}$alkyl or $C_{1-4}$alkyl substituted by OH, $C_{1-4}$alkoxy, halogen or phenyl;
and $R_3$ is hydrogen, $C_{1-22}$alkyl, $C_{2-22}$alkenyl or $C_{2-22}$ alkynyl;
or of formula I'

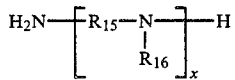

in which
each $R_{15}$, independently, is $C_{2-4}$alkylene;
each $R_{16}$, independently, is hydrogen or a group

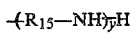

and x and y are integers such that the molecular weight of the compound of formula I' lies between 300 and 70,000
in free base or wholly or partly in acid addition salt form.

6. A process according to claim 1 in which application of compound (A) or (A1) is by a batchwise exhaust process from a bath containing 0.5 to 8% of compound (A) (A1) based on dry weight of substrate, at 20° to 90° C. and pH 4 to 14.

7. A process according to claim 1 in which the textile substrate is pretreated with a polymeric compound (A1).

8. A process according to claim 1 in which the textile substrate is pretreated and then dyed with a reactive dye at pH 3 to 7.

9. A process according to claim 8 in which the textile substrate is a mixed cotton/polyester fabric and the dyeing step is a one bath process using a mixture of disperse and reactive dyes.

10. A process according to claim 1 in which the pretreated and dyed substrate is then aftertreated with a fixing agent.

11. A process according to claim 10, in which the fixing agent is a compound (A) or (A1) or (C) the product of reacting a mono- or polyfunctional primary or secondary amine with cyanamide, dicyandiamide, guanidine or bisguanidine or (D) the product of reacting product (C) further with an N-methylol compound in the presence of a catalyst, or a mixture of (C) and (D).

12. A process according to claim 1 in which the pretreatment agent (A) is a linear polymer (A1) prepared by reacting 1.5 to 2.5 moles of epihalohydrin or a precursor thereof with 1 mole of a polyalkylene polyamine of formula Ia

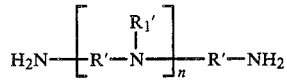

where
each R', independently, is $C_{2-4}$alkylene,
each $R_1'$, independently, is phenyl, $C_{1-4}$alkyl or $C_{1-4}$alkyl substituted by —OH, —$C_{1-4}$alkoxy, halogen or phenyl,
and n is an integer from 1 to 5
in water or an organic solvent at a temperature not exceeding 40° C., and not remaining at 40° C. for longer than 1 hour after all the epihalohydrin has been added.

13. A process according to claim 1 in which the textile substrate comprises cellulose, polyamide, acid modified polyamide or acid-modified polyester, and the polymeric compound (A) or (A1) applied simultaneously with a basic dyestuff from the same dyebath.

14. An undyed textile substrate to which has been applied the pretreatment step of the process according to claim 1.

15. A process according to claim 5 wherein compound (A) is the product of reacting epichlorohydrin or dichlorohydrin with a polyalkylene polyamine of formula I or I' in a ratio of 0.15 to 2.5 mols of epichlorohydrin or dichlorohydrin per basic nitrogen atom in a molecule of the polyalkylene polyamine.

16. A process according to claim 12 wherein the compound (A') is of formula IV

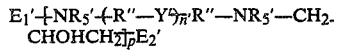

where
$R_5'$ is H or —$CH_2CHOHCH_2Cl$,
Y' is —$NR_1''$— or

R'' is —C$_2$H$_4$— or —C$_3$H$_6$—,
R$_1$'' is —CH$_3$ or —C$_2$H$_5$,
p is a number from 3 to 30,
E$_1$' is H or ClCH$_2$CHOHCH$_2$—
E$_2$' is Cl or —NR$_5$'—(R''—Y$^2$)$_{\overline{n}'}$R''—NR$_5$'H and of the two groups R$_5$' in the repeating unit, on average 0.5 to 1.5 are —CH$_2$CHOHCH$_2$Cl.

17. A process according to claim 15 wherein the compound (A) or (A1) is applied to the textile substrate, prior to the dyestuff or optical brightener, by a batchwise exhaust process from a bath containing 0.5 to 8% of compound (A) or (A1) based on the dry weight of the substrate, at 20° to 90° C. and pH 4 to 14.

18. A process according to claim 17 wherein the pH of the bath is 10 to 14.

19. A process according to claim 17 which comprises applying to the substrate, subsequently to the application of compound (A) or (A1), a 1:1 or 1:2 metal complex direct dye having at least two sulphonic acid or sulphonamide groups and a molecular weight of at least 1,000 and a degree of exhaustion on cotton of 70–100% when dyed at the boil at 1/1 standard depth.

20. A process according to claim 16 wherein the compound (A') is of formula IVa

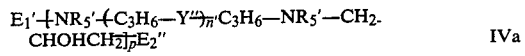

in which
Y'' is —NCH$_3$— or

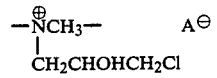

E$_2$'' is Cl or —NR$_5$'—(C$_3$H$_6$—Y''$)_{\overline{n}'}$C$_3$H$_6$NR$_5$'H
R$_5$', E$_1$', n', p and A$^\ominus$ are as defined in claim 16 and of the two groups R$_5$' in the repeating unit, on average 0.8 to 1.3 are —CH$_2$CHOHCH$_2$Cl.

21. A process according to claim 20 which comprises applying to the textile substrate a compound (A') as defined in claim 20 and applying subsequently thereto a direct dyestuff containing one or two mono- or di-chlorotriazinyl groups per molecule.

22. A process according to claim 20 which comprises applying to the textile substrate a compound (A') as defined in claim 20 and then dyeing the substrate with a reactive dye at pH 3 to 7.

* * * * *